(12) United States Patent
Sabih

(10) Patent No.: US 7,310,396 B1
(45) Date of Patent: Dec. 18, 2007

(54) ASYNCHRONOUS FIFO BUFFER FOR SYNCHRONIZING DATA TRANSFERS BETWEEN CLOCK DOMAINS

(75) Inventor: Sabih Sabih, Austin, TX (US)

(73) Assignee: Xilinx, Inc., San Jose, CA (US)

( * ) Notice: Subject to any disclaimer, the term of this patent is extended or adjusted under 35 U.S.C. 154(b) by 752 days.

(21) Appl. No.: 10/402,706

(22) Filed: Mar. 28, 2003

(51) Int. Cl.
  *H04L 7/00* (2006.01)
(52) U.S. Cl. .................. 375/354; 375/372; 711/100
(58) Field of Classification Search ................ 375/354, 375/372, 371; 370/503, 505; 371/516; 711/100, 711/101, 103, 104, 110, 111, 154, 167, 719, 711/776
See application file for complete search history.

(56) References Cited

U.S. PATENT DOCUMENTS

| | | | |
|---|---|---|---|
| 4,672,609 A * | 6/1987 | Humphrey et al. | 714/719 |
| 5,509,038 A | 4/1996 | Wicki | |
| 5,905,766 A * | 5/1999 | Nguyen | 375/354 |
| 5,915,107 A * | 6/1999 | Maley et al. | 713/400 |
| 6,033,441 A * | 3/2000 | Herbert | 713/375 |
| 6,049,887 A | 4/2000 | Khandekar et al. | |
| 6,055,285 A | 4/2000 | Alston | |
| 6,057,789 A * | 5/2000 | Lin | 341/61 |
| 6,128,749 A | 10/2000 | McDonnell et al. | |
| 6,163,545 A | 12/2000 | Flood et al. | |
| 6,333,646 B1 * | 12/2001 | Tsuzuki | 327/47 |
| 6,359,479 B1 | 3/2002 | Oprescu | |
| 6,366,530 B1 | 4/2002 | Sluiter et al. | |
| 6,366,991 B1 | 4/2002 | Manning | |
| 6,396,887 B1 | 5/2002 | Ware et al. | |
| 6,424,688 B1 | 7/2002 | Tan et al. | |
| 2002/0120902 A1 * | 8/2002 | Brown | 714/776 |

OTHER PUBLICATIONS

Clifford E. Cummings; "Simulation and Synthesis Techniques for Asynchronous FIFO Design"; SNUG San Jose 2002, Rev 1.1; pp. 1-21.
U.S. Appl. No. 10/402,702, filed Mar. 28, 2003, Sabih.

* cited by examiner

*Primary Examiner*—Chieh M. Fan
*Assistant Examiner*—Jaison Joseph
(74) *Attorney, Agent, or Firm*—Arthur J. Behiel

(57) ABSTRACT

An asynchronous FIFO buffer communicates data between first and second clock domains. The FIFO buffer includes a shift register that accepts and shifts out data at a relatively high output frequency required for the second clock domain. The input data is loaded into the shift register in synchronization with the output clock; input data is not loaded into the shift register on each cycle of the output clock, however, because the input clock is slower than the output clock. A clock comparison circuit compares the input and output clocks and tracks the history of data transfers into the shift register to determine whether a given input datum should be loaded into the shift register during a given period of the output clock. The clock comparison circuit writes input datum into the shift register periodically, skipping write cycles as necessary so that input and output data rates match.

8 Claims, 7 Drawing Sheets

ASYNCHRONOUS FIFO BUFFER FOR SYNCHRONIZING DATA TRANSFERS BETWEEN CLOCK DOMAINS

BACKGROUND

Digital logic circuits must sometimes coordinate operations across a synchronization boundary between two different clock domains operating at different clock speeds. In particular, a first-in-first-out (FIFO) memory is sometimes used to transfer data, commands and/or other information between the two different clock domains. Data is stored into the FIFO memory in a "write" clock domain at a write clock speed and read from the FIFO memory in a "read" clock domain at a read clock speed.

A FIFO memory write pointer, typically a register, is maintained in the write clock domain to point to the FIFO memory location in which data can be stored into the FIFO memory. A FIFO memory read pointer, also typically a register, is maintained in the read clock domain to point to the FIFO memory location from which data can be read from the FIFO memory. The FIFO memory read pointer and the FIFO memory write pointer are compared to each other to generate status information for the FIFO memory. Typically, the status information includes an "empty" signal, which indicates that all FIFO memory locations are empty, or no valid data is present. A "full" (no room for additional valid data) signal indicates that all FIFO memory locations are full, or contain valid data. The empty signal is used to determine whether valid data can currently be read from the FIFO memory. The full signal is used to determine whether new data can currently be added to the FIFO memory.

Using the full and empty signals, a synchronization mechanism is implemented in the FIFO memory to prevent "overrun" and "underrun" conditions when writing to and reading from the FIFO memory. An overrun condition occurs when data is added to a FIFO memory location and overwrites previous data that has not yet been read from that FIFO memory location. An underrun condition occurs when data is read from a FIFO memory location before valid data has been stored into that FIFO memory location. The FIFO memory operations are typically synchronized by passing "handshaking" signals between the write clock domain and the read clock domain to request, acknowledge and reject data operations on the FIFO memory.

Pointer management and handshaking are complex functions that may be difficult to accomplish using standard cells. Moreover, handshaking can introduce latency, slowing data translation. There is therefore a need for an asynchronous FIFO design that can be made from standard cells, and that is consequently easily scalable between processes, and that simplifies pointer management.

SUMMARY

The present invention is directed to an asynchronous FIFO buffer, or "gearbox," that communicates data between first and second clock domains. An exemplary embodiment of the present invention includes a FIFO buffer that does not require handshaking or complex pointer management circuitry, and may be easily implemented using standard cells. The reduction in design and process complexity saves die area and reduces power consumption.

The FIFO buffer includes a shift register that accepts and shifts out data at a relatively high output frequency required for the second clock domain. No output pointer is required because the shift register shifts data out at the output frequency. The input data is loaded into the shift register in synchronization with the output clock; input data is not loaded into the shift register on each cycle of the output clock, however, because the input clock is slower than the output clock.

The exemplary embodiment may further include a clock comparison circuit that compares the input and output clocks and tracks the history of data transfers into the shift register to determine whether a given input datum should be loaded into the shift register during a given period of the output clock. The clock comparison circuit writes input datum into the shift register periodically, skipping write cycles as necessary so that input and output data rates match. In another embodiment, the clock comparison circuit employs a state machine to track the history of data transfers into and out of the shift register, and to update an input pointer to the shift register accordingly.

This summary does not limit the invention, which is defined instead by the appended claims.

DETAILED DESCRIPTION

Figure 1:
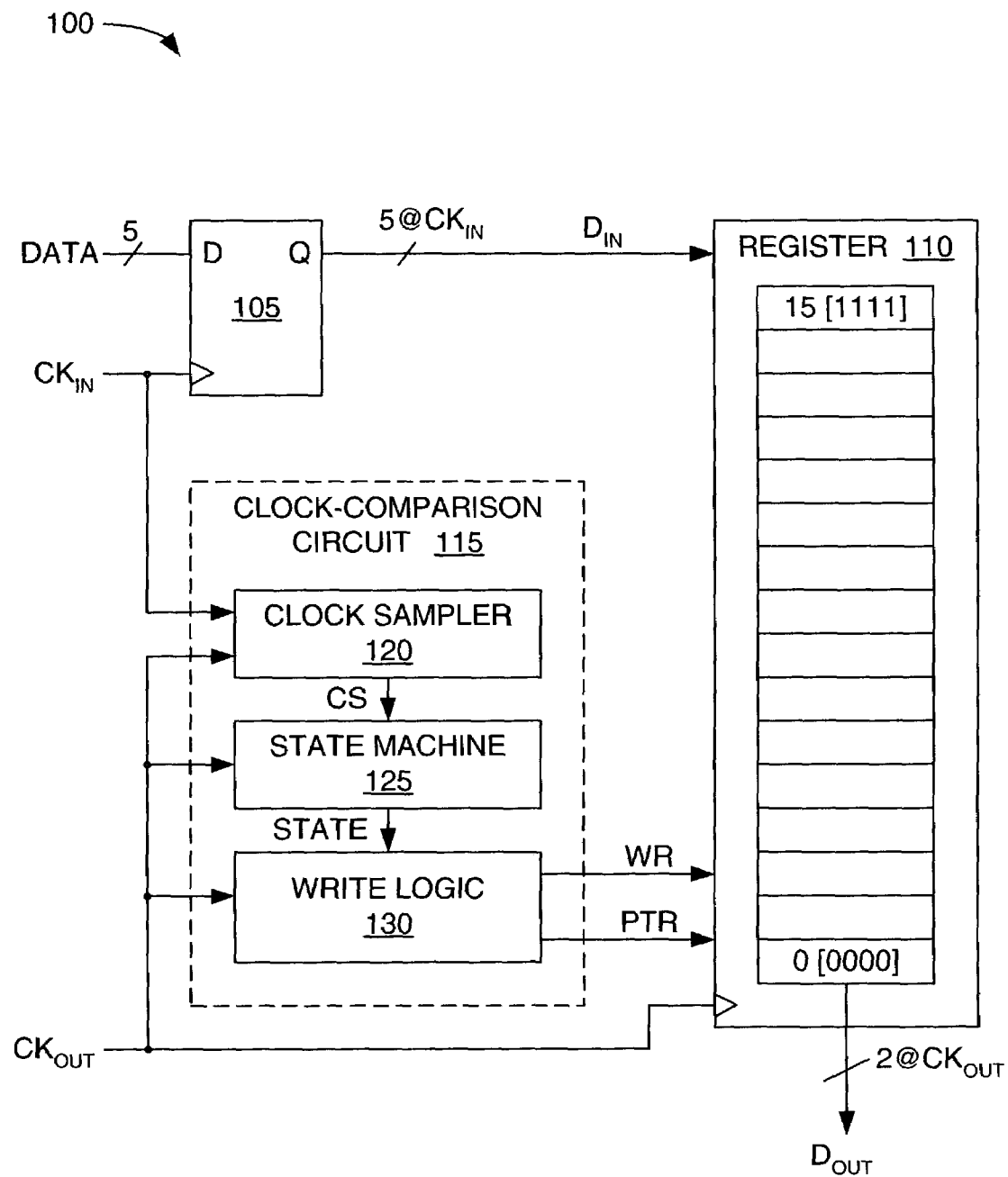
FIG. 1 depicts an asynchronous first-in-first-out (FIFO) buffer 100 in accordance with one embodiment of the invention.

FIG. 1 depicts an asynchronous first-in-first-out (FIFO) buffer 100 in accordance with one embodiment of the invention. FIFO buffer 100 captures a stream of input data $D_{IN}$ at a first clock rate $CK_{IN}$ and outputs the same data a second clock rate $CK_{OUT}$. In an illustrative example, the input data $D_{IN}$ is five-bits wide, the output data is two bits wide, and the ratio of the input clock frequency to the output clock frequency is two over five. The input and output data bandwidths are therefore equivalent (i.e., $D_{IN}CK_{IN}=D_{OUT}CK_{OUT}$). FIFO buffer 100 does not require handshaking or an output pointer, and so avoids much of the complexity of conventional high-performance asynchronous FIFO buffers. Also important, FIFO 100 can be implemented using standard cells, and is therefore easily scalable between device processes.

FIFO buffer 100 includes a five-bit sequential storage element 105, a shift register 110, and a clock comparison circuit 115. Storage element 105 captures each five-bit input datum on terminal $D_{IN}$ upon each rising edge of input clock $CK_{IN}$. Register 110 produces one two-bit output datum on terminal $D_{OUT}$ for each rising edge of output clock $CK_{OUT}$.

Clock comparison circuit 115 synchronizes the loading of data from storage element 105 into register 110 with output clock $CK_{OUT}$. Because the output clock $CK_{OUT}$ is faster than the input clock $CK_{IN}$, clock comparison circuit 115 does not transfer data from element 105 into register 110 on every rising edge of output clock $CK_{OUT}$; instead, clock comparison circuit 115 samples input clock $CK_{IN}$ with output clock $CK_{OUT}$ to determine when to load data from storage element 105 into register 110. Clock comparison circuit 115 additionally tracks the level of data present in register 110, and consequently knows the appropriate address locations in which to load each successive input datum. In this simple example, register 110 includes sixteen single-bit address locations 0000 through 1111.

Clock comparison circuit 115 includes a clock sampler 120, a state machine 125, and some write logic 130. Clock sampler 120 samples input clock $CK_{IN}$ with the relatively fast output clock $CK_{OUT}$ and produces a clock-sample output CS on a like-named terminal. (Throughout the present disclosure, signal nodes—e.g., lines, terminals, or pads—and the signals they carry are referred to using like designations; in each case, whether a given reference is to a signal or the corresponding node will be clear from the context.) Clock sample CS is a logic one if input clock $CK_{IN}$ is a logic one upon a rising edge of output clock $CK_{OUT}$ and is a logic zero if input clock $CK_{IN}$ is a logic zero upon a rising edge of output clock $CK_{OUT}$.

State machine 125 tracks the history of data transfers into register 110 from storage element 105. State machine 125 then decides, based on this history and the clock sample value CS, whether to load data from storage element 105 into register 110 upon a given edge of output clock $CK_{OUT}$. Depending upon the received state, write logic 130 either subtracts two from the current value of a least-significant-bit pointer PTR to account for the removal of two output data bits, or loads the five-bit datum in storage element 105 into register 110 and adds three to the current value of pointer PTR to account for the combined effect of removing two bits and adding five bits to register 110.

Figure 2:
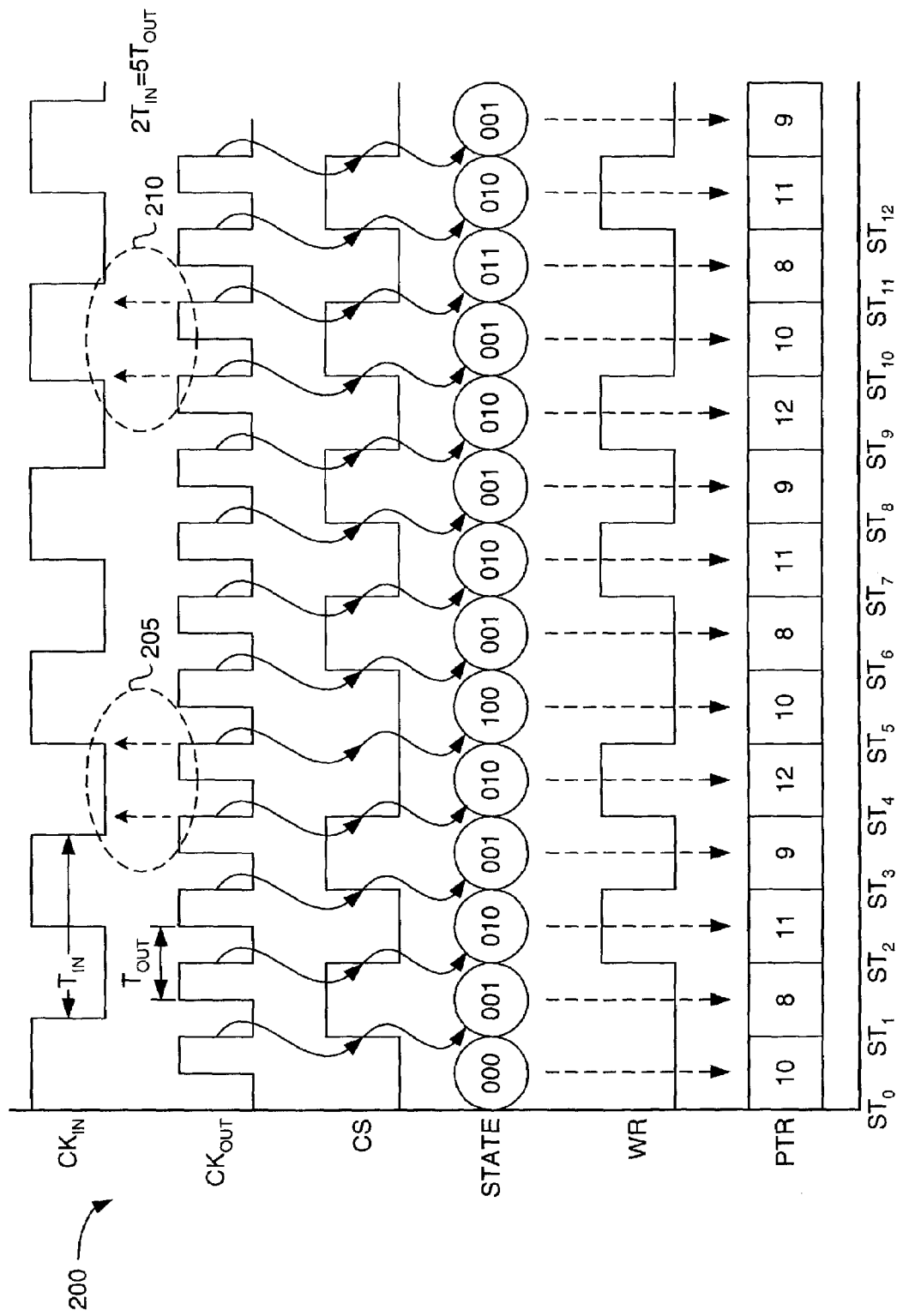
FIG. 2 is a waveform diagram 200 used here to describe the operation of FIFO buffer 100 of FIG. 1.

FIG. 2 is a waveform diagram 200 used here to describe the operation of FIFO buffer 100 of FIG. 1. Register 110 produces two bits of output data $D_{OUT}$ on each rising edge of output clock $CK_{OUT}$. Storage element 105 latches the input data on each rising edge of input clock $CK_{IN}$; new and valid input data is therefore present in storage element 105 when input clock $CK_{IN}$ is a logic zero. Clock sampler 120 samples input clock $CK_{IN}$ with falling edges of output clock $CK_{OUT}$ to determine whether $CK_{IN}$ is a zero; generally, if the input clock is zero on the falling edge of the output clock, new data is present in storage element 105. Occasionally, however, as noted using an ellipse 205, the faster output clock samples two logic zeros in a row. In this case, no new data is present in storage element 105, so clock comparison circuit 115 does not load the data from storage element 105 into register 110.

Figure 3:
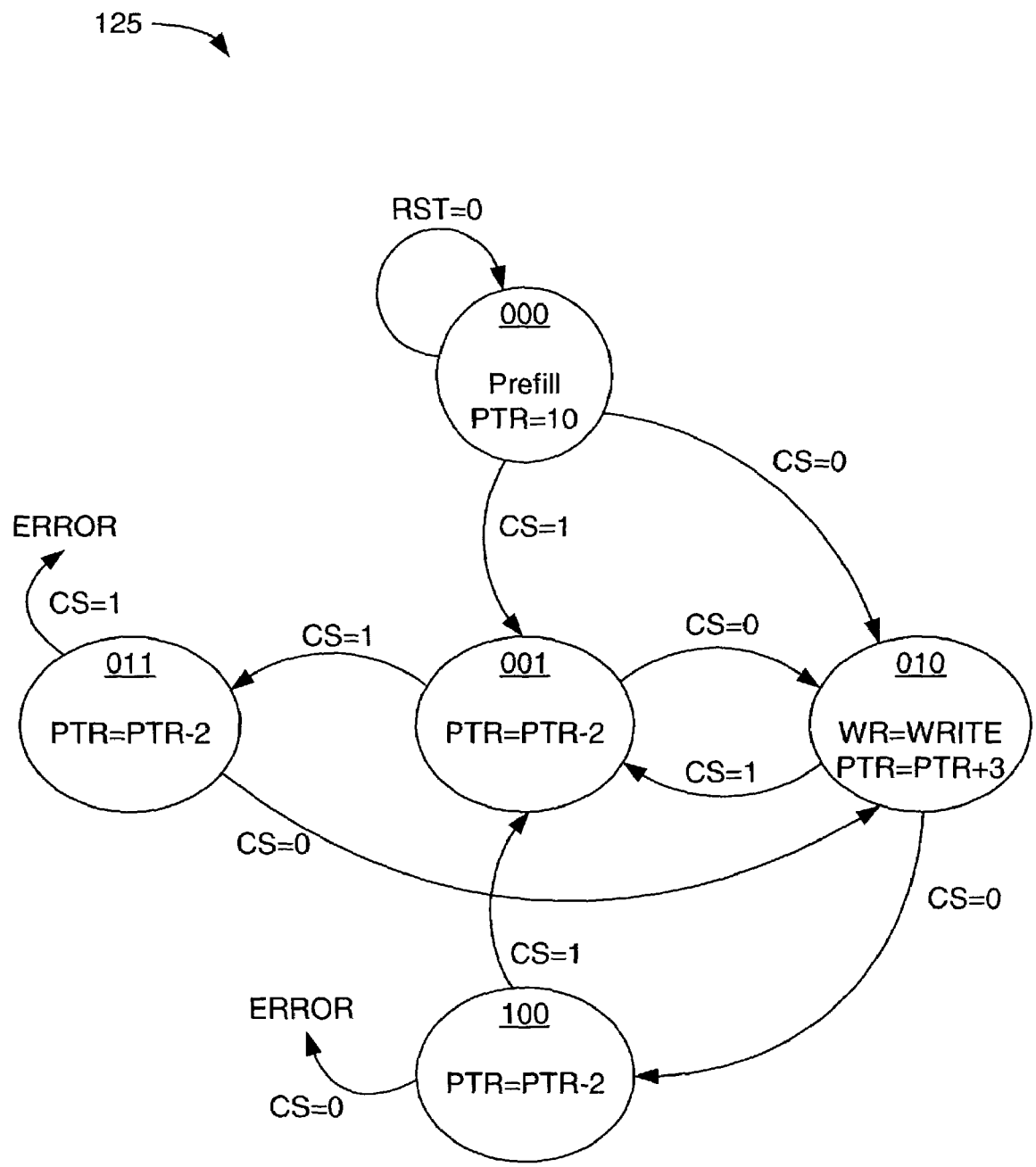
FIG. 3 depicts the operation of state machine 125 of FIG. 1.

FIG. 3 graphically depicts the operation of state machine 125 of FIG. 1 and is used in conjunction with FIGS. 1 and 2 to describe the operation of FIFO buffer 100. In FIG. 2, the process begins at state transition ST0, at which time state machine 125 is in state 000. Some time before or during state 000, register 110 is pre-filled with some amount of data, filling address locations zero through ten (0000-1010) in this example. Pre-filling register 110 allows the amount of data stored in register 110 to fluctuate to account for the required asynchronous data transfer. This aspect of the invention will become more apparent in view of the following discussion.

At state transition ST1, output clock $CK_{OUT}$ samples a logic one, causing clock sampler 120 to produce a logic one clock sample CS to state machine 125. As shown in the state diagram of FIG. 3, state machine 125 then transitions to state 001. Write logic 130 responds by decrementing the pointer PTR by two to account for the two bits of output data $D_{OUT}$ shifted output of register 110 upon the following rising edge of output clock $CK_{OUT}$. Pointer PTR is therefore reduced from ten to eight.

At state transition ST2, output clock $CK_{OUT}$ samples a logic zero, causing clock sampler 120 to produce a logic zero clock sample CS to state machine 125. State machine 125 then transitions to state 010. In this state, write logic 130 writes the five-bit datum in storage element 105 into register 110 and increases the pointer by three to account for the five bits added to register 110 and the two bits removed on the rising edge of the output clock. Pointer PTR is therefore increased from eight to eleven.

State machine 125 generally transitions back and forth between states 001 and 010 until clock sampler 120 samples either two zeros or two ones in a row. The case of two successive zeroes is highlighted by ellipse 205. State machine 125 is in state 010 after the first zero sample in ellipse 205 (after state transition ST4). The successive zero sample causes state machine 125 to transition to state 100. Write logic 130 then decreases the pointer by two to account for the two bits removed as output data $D_{OUT}$ on the next rising edge of the output clock. Pointer PTR is therefore decreased, in this case from twelve to ten.

An ellipse 210 highlights the case in which clock sampler 120 samples two successive ones. State machine 125 is in state 001 after the one zero sample in ellipse 205 (after state transition ST10). The successive one sample causes state machine 125 to transition to state 011. Write logic 130 then decreases the pointer by two to account for the two bits removed as output data $D_{OUT}$. Pointer PTR is therefore decreased, in this case from ten to eight.

Figure 4:
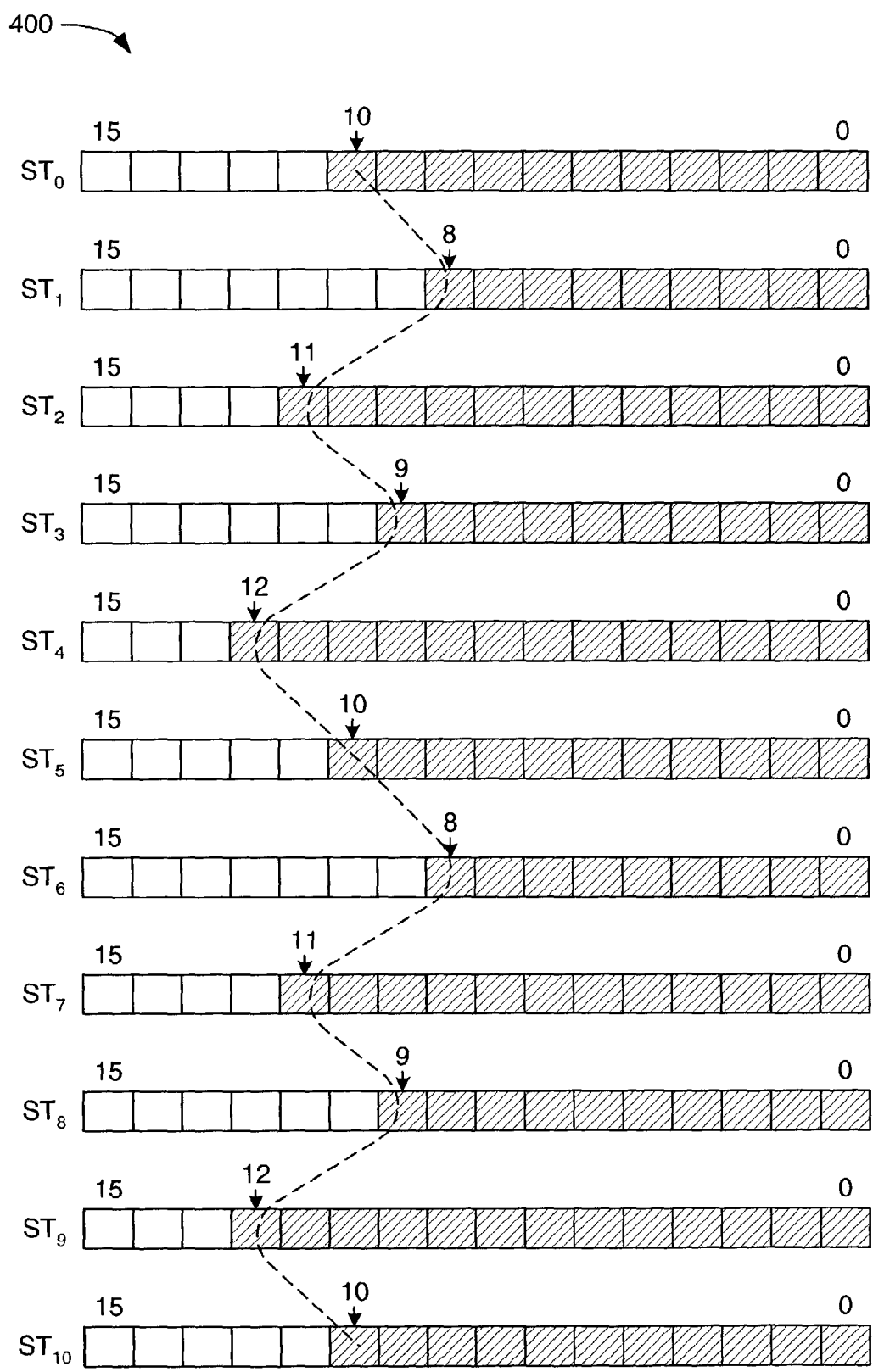
FIG. 4 illustrates the fill levels of register 110 subsequent each state transition ST0-ST10 of FIG. 2.

FIG. 4 graphically illustrates the fill levels of register 110 subsequent each state transition ST0-ST10 of FIG. 2; the same information is noted in line PTR of FIG. 2. As is apparent in the illustration, the fill level of register 110 fluctuates over time. In this ideal case, the fluctuation centers on ten, the pre-fill level. Indeed, the average value over five state transitions is exactly ten (10+8+11+9+12=50, and 50/5=10). The sixteen address locations of register 110 is therefore more than adequate to compensate for the fluctuations produced by the asynchronous operation of FIFO 100. In a real device, however, the relationship between the input and output clocks tends to drift over time, causing the average fill level of FIFO buffer 110 to drift as well. The size of register 110 can easily be expanded as necessary to account for any expected relative frequency drift between the input and output clocks.

Figure 5A:
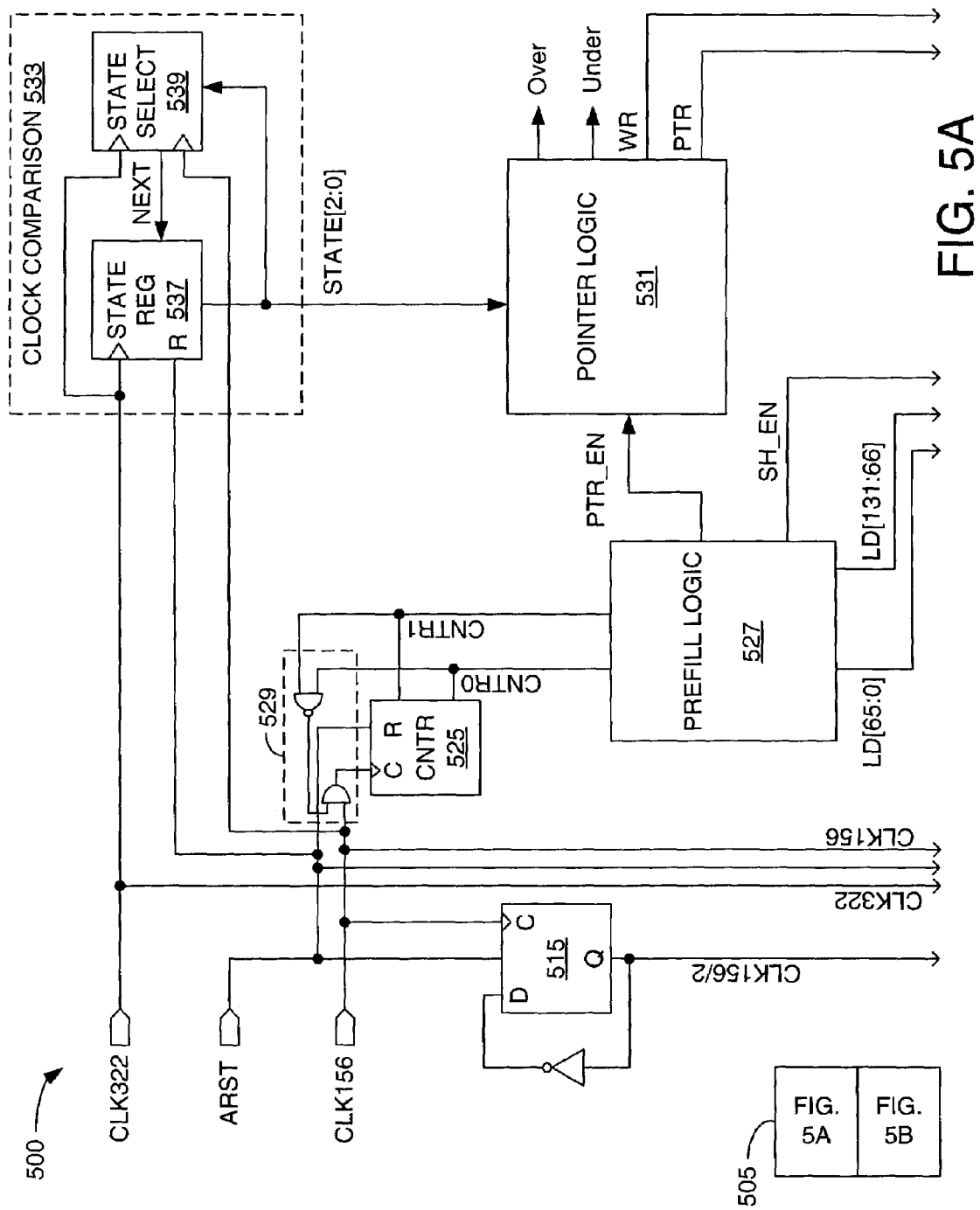
FIGS. 5A and 5B depicts a FIFO buffer 500 in accordance with an embodiment of the invention that translates sixty-six bit input data $D_{IN}$ at 156 MHz into thirty-two bit output data $D_{OUT}$ at 322 MHz.
Figure 5B:
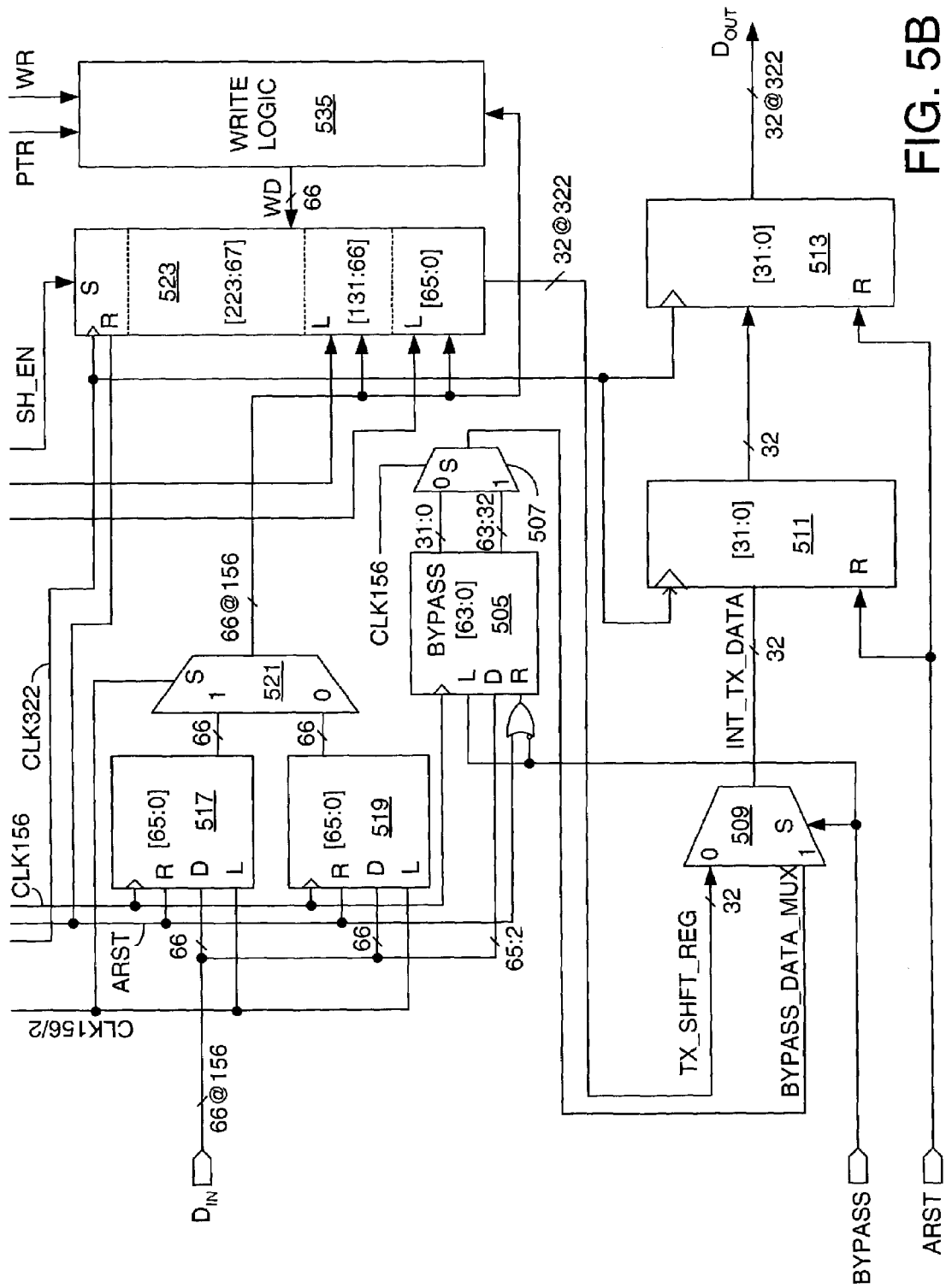

FIGS. 5A and 5B depicts a FIFO buffer 500 in accordance with an embodiment of the invention that translates sixty-six bit input data $D_{IN}$ at 156.25 MHz clock domain (hereafter rounded to 156 MHz) into thirty-two bit output data $D_{OUT}$ at 322.265625 MHz (hereafter rounded to 322 MHz); a key 505 at the bottom of FIG. 5A shows how FIGS. 5A and 5B relate to one another. FIFO buffer 500 provides for asynchronous data translation in the manner described above in connection with FIFO buffer 100 of FIG. 1, and additionally supports a bypass mode that merely truncates the input data as necessary to account for differences in input and output data width. The 322 MHz clock is derived from the 156 MHz clock using a conventional phase-lock loop (not shown).

Bypass Mode

FIFO buffer 500 supports a bypass mode that can be used to bypass the gearbox function for test purposes. In the bypass mode, one or both clock signals on terminals CLK156 and CLK322 are altered so the output and input clock signals have exactly a two-to-one ratio. Asserting bypass enable signal BYPASS enables a 64-bit bypass register 505 to receive input data $D_{IN}$ on each rising edge of the input clock signal provided on clock terminal CLK156 in the bypass mode. A multiplexer 507 presents half of the contents of register 505 on alternating half cycles of CLK 156, thus providing thirty-two bits at twice the input clock frequency to an input of another multiplexer 509. The data from multiplexer 509 is then conveyed to output terminal $D_{OUT}$ via a pair of series-connected output registers 511 and 513. The use of two successive synchronizing registers 511 and 513 helps FIFO buffer 500 tolerate a degree of metastability.

Asynchronous Data Transfer Mode: the Input Registers

The input circuitry of FIFO 500 includes a clock divider 515, a pair of 66-bit input registers 517 and 519, and a multiplexer 521. Clock divider 515 divides the input clock CLK156 by two and presents the resulting clock signal CLK156/2 to registers 517 and 519 and multiplexer 521. Registers 517 and 519 thus capture input data $D_{IN}$ on alternating rising edges of the input clock CLK156. Multiplexer 521, also controlled by clock signal CLK156/2, alternately outputs the contents of registers 517 and 519 to provide a registered version of the sixty-six bit input data $D_{IN}$ at 156 MHz.

Pre-Fill

FIFO buffer 500 includes a 224-bit shift register 523 analogous to shift-register 110 of FIG. 1. Register 523 is pre-filled with two 66-bit samples of input data $D_{IN}$, filling address locations zero through 131. The pre-fill operation employs a counter 525 and some pre-fill logic 527.

De-asserting an asynchronous reset signal ARST activates FIFO buffer 500. Then, upon receipt of input data $D_{IN}$ accompanied by input clock CLK156, counter 525 increments on each rising edge of clock CLK156. Pre-fill logic 527 controls shifter register 523 in response to the count provided by counter 525, loading the first input datum into address locations 65:0 when counter 525 provides a logic one and loading the second input datum into address locations 131:66 when counter 525 provides a logic two. When counter 525 reaches a count of three (binary 11), combinatorial logic 529 disables counter 525 from counting further and pre-fill logic 527 asserts (1) a pointer enable signal PTR_EN to enable pointer logic 531; and (2) a shift-enable signal SH_EN to enable shift register 523 to begin shifting out data on rising edges of output clock CLK322. Both load signals LD[65:0] and LD[131:66] from pre-fill logic 527 are de-asserted and remain so for the duration of the data-transfer operation. FIFO buffer 500 is thus prepared to begin operating in the asynchronous transfer mode.

Asynchronous Transfer Mode

In addition to some of the components introduced above, the asynchronous transfer mode employs a clock comparison circuit 533 and some write logic 535. Clock comparison circuit 533 is an asynchronous state machine that tracks the history of data transfers into register 523 and decides, based on this history and a comparison of the input and output clocks CLK156 and CLK322, whether to load data $D_{IN}$ from multiplexer 521 into shift register 523.

Figure 6:
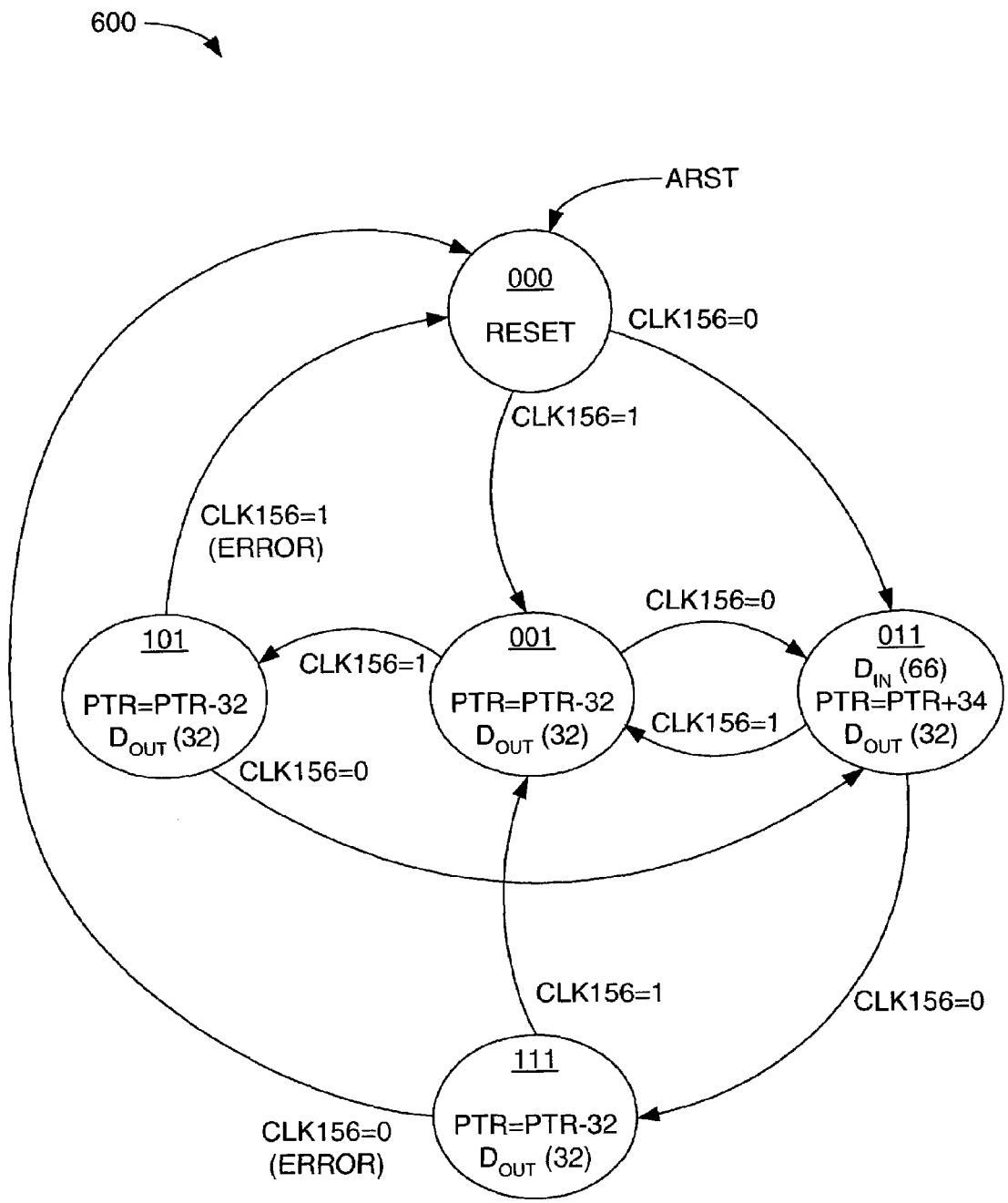
FIG. 6 is a state diagram 600 illustrating the operation of clock comparison circuit 533 of FIGS. 5A and 5B.

Clock comparison circuit 533 includes a state register 537 and state-select logic 539, which together form a state machine similar to state machine 125 of FIGS. 1 and 3. FIG. 6 is a state diagram 600 illustrating the operation of clock comparison circuit 533 and is used in conjunction with FIGS. 5A and 5B to describe the operation of the asynchronous transfer mode of FIFO buffer 500.

State register 537 begins in state 000 when asynchronous reset signal ARST is de-asserted. State select logic 539 samples input clock CLK156 with each falling edge of output clock CLK322 and, using the sample result and the current state, determines the appropriate next state NEXT for state register 537. Pointer logic 531 adjusts the pointer PTR and issues write commands WR to write logic 535 depending upon the selected state STATE, but only after pre-fill logic 527 issues the enable signal PTR_EN.

State register 537 loads the next state NEXT upon each rising edge of output clock CLK322. In most states (001, 101, and 111), pointer PTR is reduced by thirty-two bits to reflect the shifting out of one output datum on terminal $D_{OUT}$. In state 011, pointer logic 531 additionally issues a write command WR, causing write logic 535 to load sixty-six bits of input data $D_{IN}$ into shifter register 523 via a write-data bus WD beginning at the address indicated by the pointer PTR. A 32-bit output datum is still shifted out, so pointer logic 531 increments the pointer by thirty-four (66−32=34).

Comparison circuit 535 spends most of its time alternating between states 001 and 011. This pattern is occasionally disrupted, however, when state select logic 539 samples two consecutive ones or two consecutive zeroes. In the case of two consecutive ones, the second sampled one causes state register 537 to transition to state 101. Given the frequency relationship between the input and output clocks in this embodiment, state select logic should never sample three consecutive ones or three consecutive zeros. State register 537 thus samples a logic zero, transitions back to state 011, and resumes alternating back and forth between states 001 and 011. Eventually, state select logic 539 will sample two consecutive logic zeros. In this case, state 111 is interposed between state 011 and state 001 to shift out an additional thirty-two bits.

Because state 011 adds two more to pointer PTR than state 001 subtracts (34 vs. 32), the pointer increases by thirty-two over sixteen cycles of output clock CLK322. Due to the relationship between the input and output clock frequencies, state select logic 539 samples consecutive logic ones or zeros every sixteen cycles of output clock CLK322, on average. In response to the consecutive samples, state register 537 inserts either state 101 or 111 between visits to states 001 and 011, and consequently shifts out thirty-two extra bits of data to compensate for the build up of data that occurred over the prior sixteen cycles.

Pointer logic 531 includes respective overrun and underrun flags OVER and UNDER that identify when the pointer PTR is over 198 or under 64, in which case FIFO buffer 500 generates a system reset.

In the example of FIGS. 5A and 5B, the output clock is just over twice the frequency of the input clock. In this case, the faster clock should never sample more than two consecutive like values of the slower clock. If the output clock where faster relative to the input clock, the state machine described in FIG. 6 could be modified allow for longer streams of ones or zeros. The invention can also be modified to account for smaller differences between input and output frequencies. For example, a FIFO in accordance with the invention can be adapted to translate 34-bit data at 10 MHz to 32-bit data at 10.625 MHz. The slower clock could be sampled on both rising and falling edges of the faster clock to yield occasional double ones and double zeros. FIFO buffer in accordance with the invention can thus be modified to translate between clock domains having similar or very diverse clock frequencies.

While the present invention has been described in connection with specific embodiments, variations of these embodiments will be obvious to those of ordinary skill in the art. The invention can be used, for example, to implement many types of multi-clock-domain circuits, including serial ports, S/PDIF (Sony/Philips Digital Interface) transceivers, and dual-port memories. Therefore, the spirit and scope of the appended claims should not be limited to the foregoing description.

What is claimed is:

1. A method of translating input data captured at a first clock frequency into output data conveyed at a second clock frequency, the method comprising:
   sampling a first clock signal carrying the first clock frequency with a second clock signal carrying the second clock frequency to produce a clock sample;
   first registering the input data synchronously with the first clock frequency using the first clock signal to provide first registered data of a first time domain associated with the first clock signal, the first registered data being registered with a first data width;
   second registering the first registered data using the second clock signal to provide second registered data of a second time domain associated with the second clock signal, the second registered data being registered with the first data width;
   generating control signaling using the clock sample for controlled output of the second registered data;
   the first clock frequency being substantially less than the second clock frequency;
   the second registering including periods of synchronous registration of the first registered data with respect to the second clock signal responsive to the sampling and including other periods of no synchronous registration with respect to the second clock signal responsive to the sampling; and
   outputting the second registered data synchronously with the second clock frequency responsive to the second clock signal to provide the output data, the output data provided with a second data width less than the first data width.

2. The method of claim 1, wherein the first clock frequency in combination with the first data width has an equivalent bandwidth to that of the second clock frequency in combination with the second data width.

3. The method of claim 2, wherein the second clock frequency is not an integer multiple of the first clock frequency.

4. The method of claim 1, wherein the sampling the first clock signal with the second clock signal is performed in the rising edge of the second clock signal, and wherein the method further comprises sampling the first clock signal with the falling edge of the second clock signal to produce another clock sample.

5. A system for converting a first data stream including a succession of input data synchronized with a first clock signal to a second data stream including a succession of output data synchronized with a second clock signal, the system comprising:
   an input register coupled to receive the input data at a first data width and configured to register the input data synchronously responsive to the first clock signal and to output the input data registered synchronously responsive to the first clock signal;
   a shift register coupled to receive the input data from the input register;
   a clock-comparison circuit coupled to receive the first clock signal and the second clock signal and configured to sample the first clock signal with the second clock signal to obtain a clock sample, the first clock signal having a first frequency substantially slower than a second frequency of the second clock signal;
   the clock-comparison circuit configured to control writing of the input data registered by the input register into the shift register;
   the shift register coupled to receive at the first data width the input data registered by the input register and for periods in synchronization with the second clock signal to register the input data obtained from the input register responsive to the clock sample and for other periods associated with the second clock signal to not register the input data obtained from the input register responsive to the clock sample;
   the shift register including an output port having a second data width for shifting out the output data synchronously with the second clock signal, the second data width being less the first data width.

6. The system of claim 5, wherein the clock-comparison circuit includes a state machine.

7. The system of claim 6, wherein the state machine transitions through a plurality of states, and wherein a current one of the states determines whether one of the input data is written into the shift register and wherein the determination is based at least in part on the clock sample.

8. The system of claim 5, wherein the first frequency in combination with the first data width has an equivalent bandwidth to that of the second frequency in combination with the second data width.

* * * * *